Figure 1:
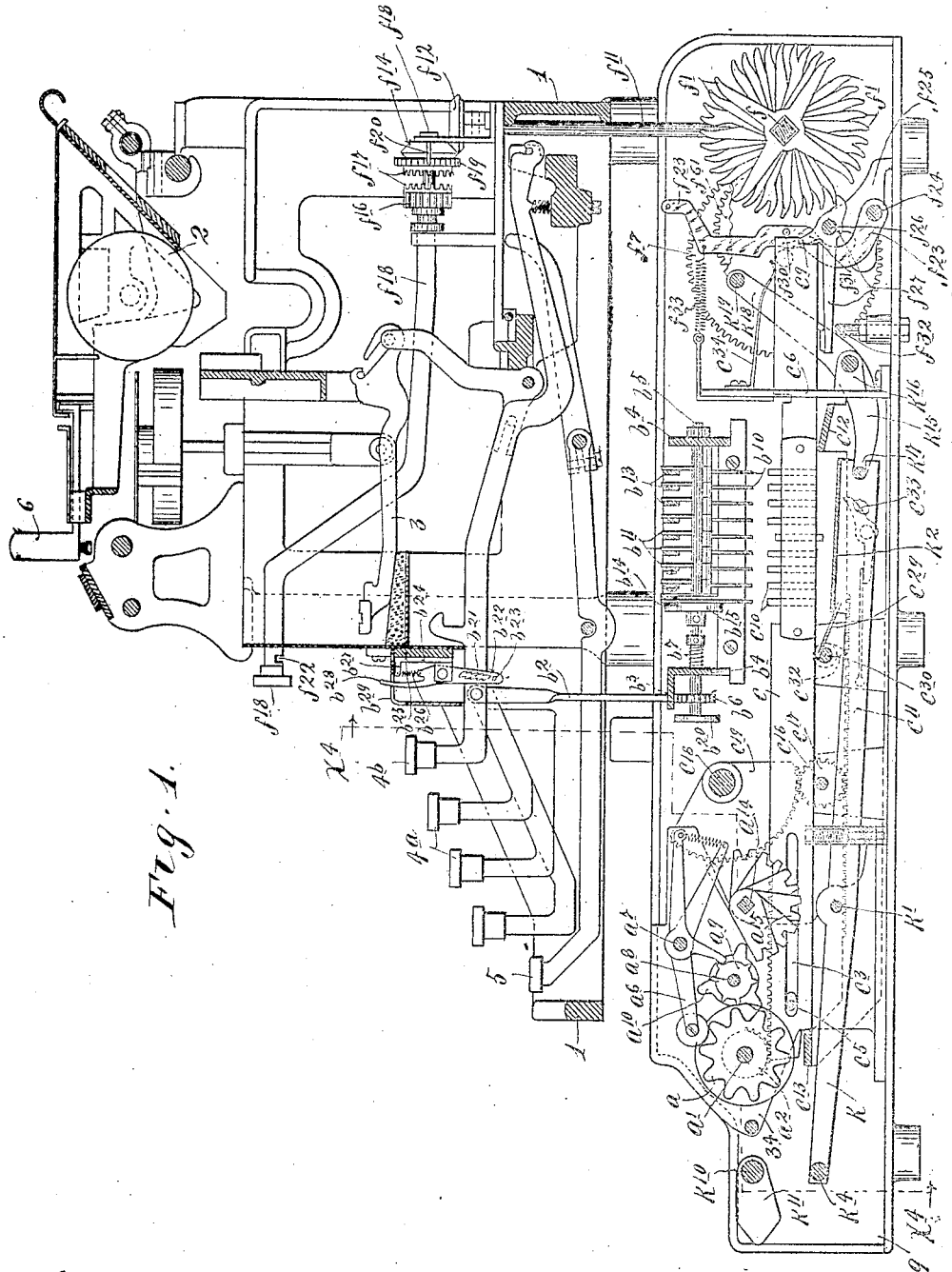

H. HANSON.
COMBINED TYPE WRITING AND COMPUTING MACHINE.
APPLICATION FILED OCT. 19, 1907.

905,422.

Patented Dec. 1, 1908.

9 SHEETS—SHEET 2.

Witnesses.
A. H. Opsahl.
L. L. Simpson

Inventor.
Hans Hanson.
By his Attorneys
Williamson Merchant

H. HANSON.
COMBINED TYPE WRITING AND COMPUTING MACHINE.
APPLICATION FILED OCT. 19, 1907.
905,422.
Patented Dec. 1, 1908.
9 SHEETS—SHEET 9.
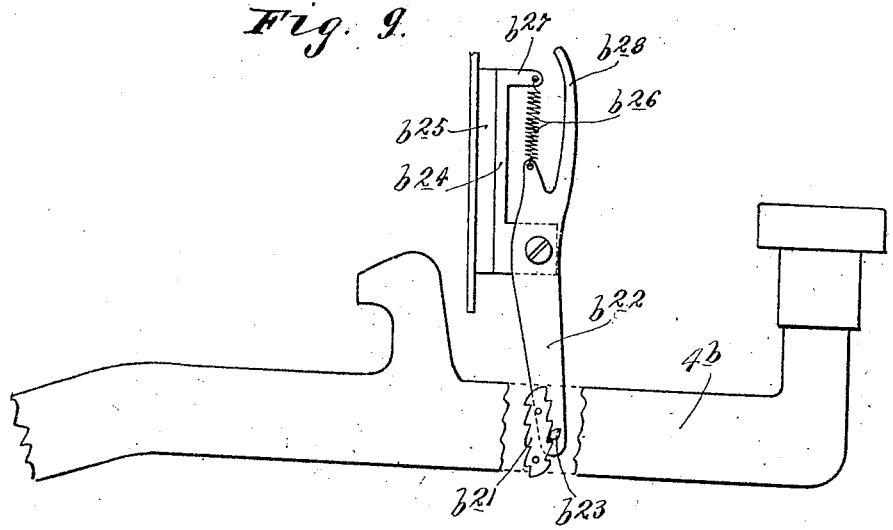
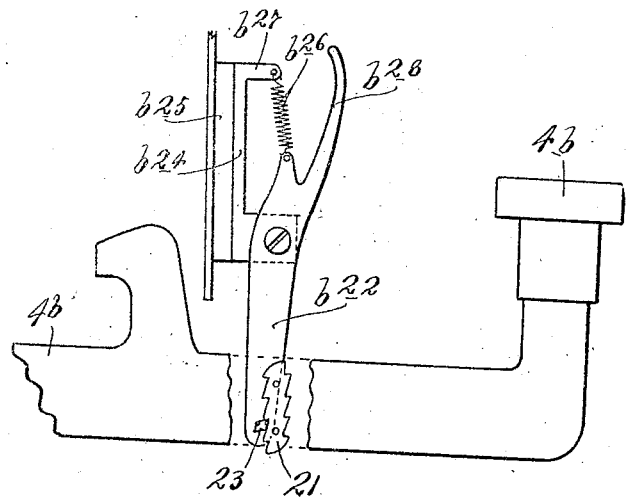
Witnesses.
A. H. Opsahl.
L. L. Simpson.
Inventor.
Hans Hanson
By his Attorneys.
Williamson & Merchant

UNITED STATES PATENT OFFICE.

HANS HANSON, OF HARTFORD, CONNECTICUT.

COMBINED TYPE-WRITING AND COMPUTING MACHINE.

No. 905,422.     Specification of Letters Patent.     Patented Dec. 1, 1908.

Application filed October 19, 1907. Serial No. 398,135.

*To all whom it may concern:*

Be it known that I, HANS HANSON, a citizen of the United States, residing at Hartford, in the county of Hartford and State of Connecticut, have invented certain new and useful Improvements in a Combined Type-Writing and Computing Machine; and I do hereby declare the following to be a full, clear, and exact description of the invention, such as will enable others skilled in the art to which it appertains to make and use the same.

My invention relates to computing machines and combined computing and type-writing machines of the kind and same general design as those shown in my prior U. S. Patent 816,319, of date March 27, 1906, and in my pending application Serial No. 276,414, filed August 30, 1905; and has for its object to provide certain improvements on my said prior machines, with a view of securing increased efficiency and a greater range of work.

To the above ends, my invention consists of the novel devices and combinations of devices hereinafter described and defined in the claims.

The computing machine of my prior patent would add numbers in vertical columns listed either as solid or punctuated matter, and the punctuation could be varied so as to mark off dollars and cents merely, or so as to mark off the whole numbers in sets of three figures, and with the dollars and cents separated by a period. The machine of my prior patent would also multiply, but required the multiplicand to be reset for every figure of the multiplier.

The machine of my pending application will add in vertical columns with or without punctuation, according to which of the two forms of decimal order selector therein disclosed shall be employed in the machine, and will multiply without requiring the multiplicand to be reset, regardless of the number of figures in the multiplier.

My machine herein disclosed will not only add numbers listed in vertical columns like my prior machines, but will add numbers listed on horizontal lines crosswise of the printed sheet. Otherwise stated, my present machine will make cross footings, or do a piece of work like this:

45.65; 103.22; 13.23; 5.02; .50; 1.00; 2274.20; 4.00=2506.82.

If the travel of the typewriter carriage be sufficient, my present machine will thus cross list and add eight numbers in each line. The means to accomplish this additional or new result constitutes one important feature of my improvement or present invention. To this end, I provide a decimal order selector or rotary tappet drum which has four whirls or spiral rows of tappets, and the tappet drum is so geared to the typewriter that it receives two revolutions to each full line of the typewriter carriage's travel. Each whirl or row of tappets will therefore be brought into action twice in each cross line, from which it follows that eight numbers can be cross listed and added.

As a detail of the new decimal order selector or rotary tappet drum, I am able to prearrange for punctuation in an extremely simple manner, to-wit, the use of a tappet with two points or tapping surfaces instead of one, wherever such punctuation is desired. For example, if the drum is built to provide for punctuation only between dollars and cents, a single two-pointed tappet is used in each whirl or row of tappets, located in the third position from the right end of the drum; and the effect of this is to make the two-pointed tappet act twice on its lifting lever, thereby requiring two steps of the typewriter's carriage movement to go by that lifting lever, thus leaving one space free wherein a period or other punctuation mark may be struck, as, for example, the period between dollars and cents.

In my prior machines, I employed a separate set of so-called computer keys, representing the digits from 1 to 9, for operating the computing machine. Said computing keys were mounted on the typewriter and were of such construction that they would also operate the corresponding numeral keys of the typewriter; and, thereby cause the latter to list or print the numbers on the typewritten sheet. The typewriter keys— both numeral and character keys—were therefore free for the ordinary typewriter usage. In practice, it was found that while the presence of the separate row of computer keys had the marked advantage above indicated, always leaving the typewriter free for ordinary usage, there were also some disadvantages. One of the most prominent of these disadvantages was a variation of the computing key touch as compared with the ordinary typewriter usage. Hence, in my present machine, I dispense with a separate row of computer keys and employ the numeral keys of the typewriter to operate the computer. I am thereby able always to have the advantage of the momentum of the type bars to help overcome the resistance or inertia of the parts of the computing mechanism set by the keys, and find that thereby the touch of the numeral keys, when in use for computing, remains nearly normal; and further, that the combined machine will be more reliable, both in respect to the printing and the computing functions. Having made this change in respect to the keys employed to operate the computer, it became necessary to make further additions or modifications in the mechanism in order to preserve an equal range of work of the same kind as that done on my prior machines. For example, it was possible on my prior machines, and is possible on my present machine, to do a piece of work like this:

```
  10 lbs. of sugar @ .5 cts. per lb___    .50
   1 ton of coal @ $7 per ton_____     7.00
  11 cords of wood @ $5 per cord__     55.00
 100 cords of wood @ $5 per cord__    500.00
                                      ───────
   Total _____   $562.50
```

It was easy enough to do this piece of work on my prior machine, because the typewriter was always free for ordinary usage, and the computer keys never used except when it was desired to list and compute. The numeral keys of an ordinary typewriter, however, such, for example, as the Underwood, each represents some other character besides its proper number, such as @, ", #, $, %, —, &, ', (, ). In doing a piece of work, like the invoice above appearing, the numeral keys must be used in specifying the items. It is obvious that when so used, they must not operate the computer; or otherwise the footings will not be accurate. Hence, I provide means which will prevent the numeral keys from operating the computer, in the zone of the typewriter's travel appropriated to the specification of the items, but permit them to operate the computer in the zone of the said carriage's travel appropriated for listing the numbers representing the charge for each specified item. This means includes a cam which is operative to hold the lifting levers out of reach of the tappets of the decimal order selector for some predetermined part of the carriage's possible travel, as, for example, three-fourths of its travel; and then to let the lifting levers come back within the field of action thereon by the tappets.

The foregoing are the principal features of my present invention. As minor features and details of improvement, I provide a somewhat improved error-correcting device; a device which will prevent the simultaneous depression of two adjacent numeral keys; and I also disclose herein a two-way full stroke device for said numeral keys, but this is also disclosed and claimed in a separate application filed of date August 12, 1907, Serial No. 388,177.

With the exception of the improvements above noted, the machine illustrated is nearly but not quite identical with the machine of my first patent. In the machine of my pending application, special preliminary representation devices were added to the machine of the first patent so as to enable multiplication, regardless of the number of figures in the multiplier, without requiring the multiplicand to be reset. All these special devices are omitted from the machine herein illustrated and described for the sake of brevity and simplicity. For the same reason, the special details, which were present in the machine of my pending application to secure high speed, are omitted from the illustrated machine. A great many of the parts represented, however, are absolutely identical with the machine of my pending application; and for this reason the same classification of the mechanism and of the reference letters applied thereto will be observed as far as possible. As to these old parts, the description will be simplified and abbreviated. The old parts will be detailed only as far as may be thought necessary to understand the improvement herein disclosed and claimed. It must be understood that the old parts, so far as not herein specified, are the same as in my prior machines, both in structure and function.

With the foregoing statements in mind, it is thought that my present machine can be fully understood and utilized from the accompanying drawings and the following further description.

My improved typewriting and computing machine is illustrated in the accompanying drawings, wherein like notations refer to like parts throughout the several views.

Figure 2:
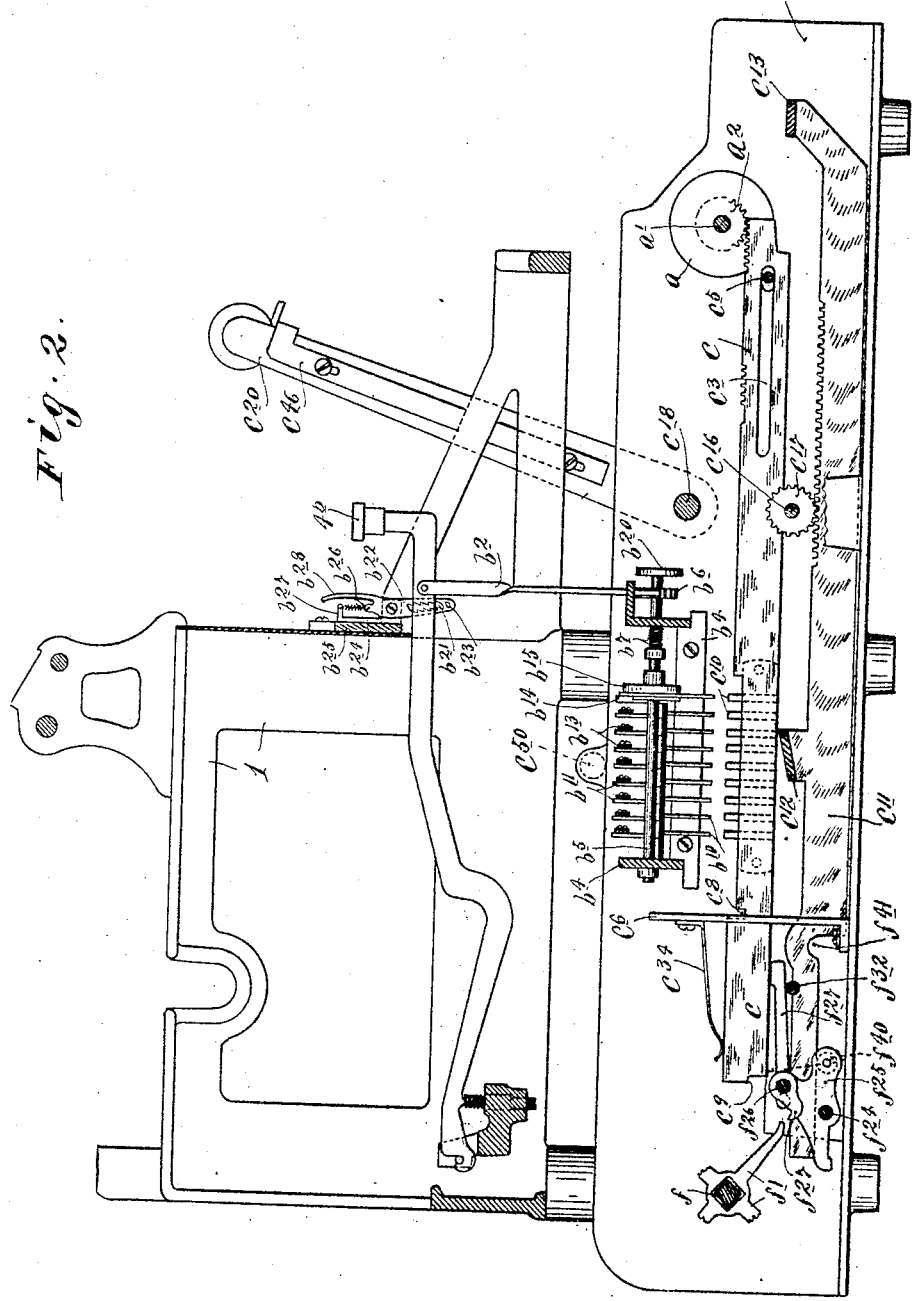
Figure 3:
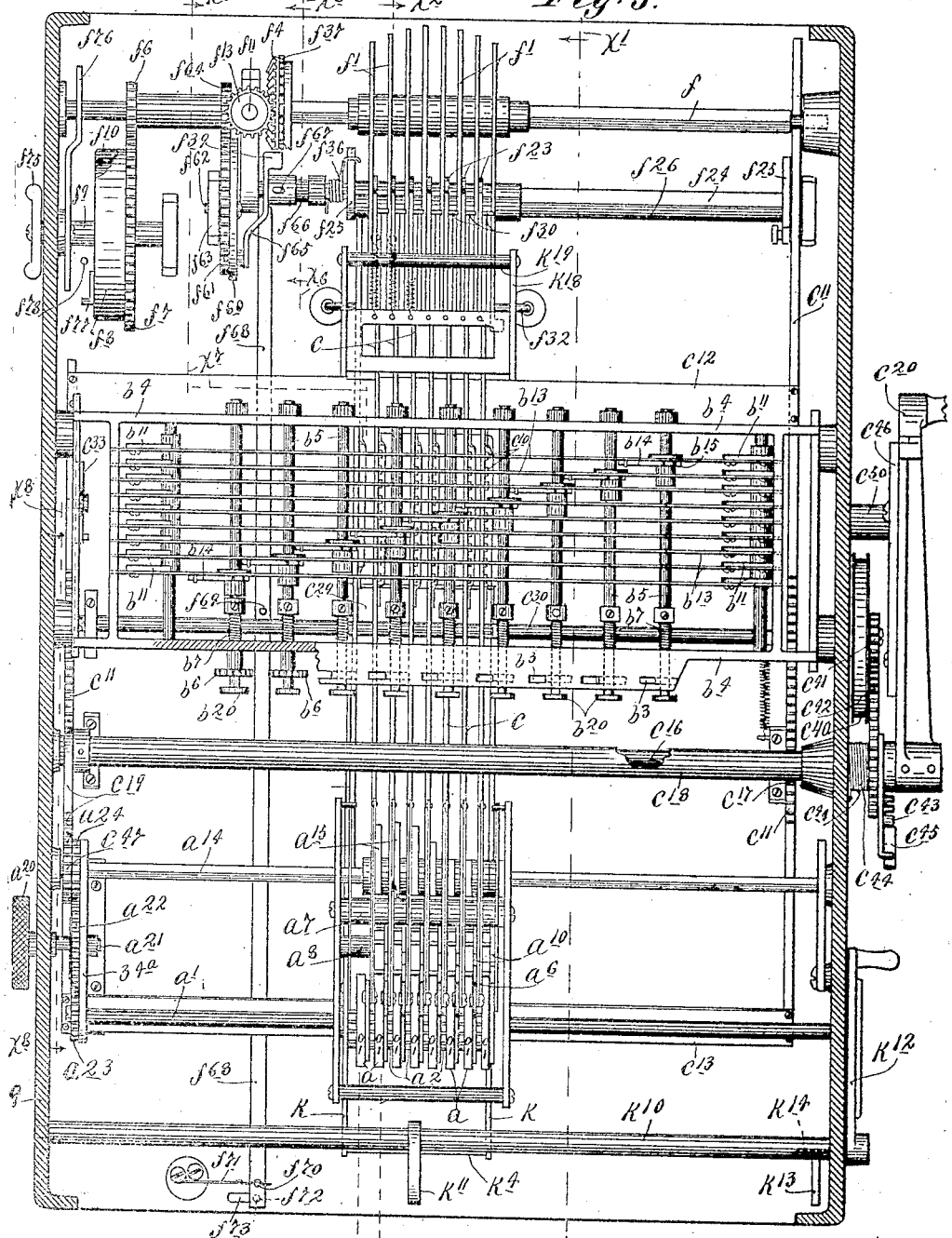
Figure 4:
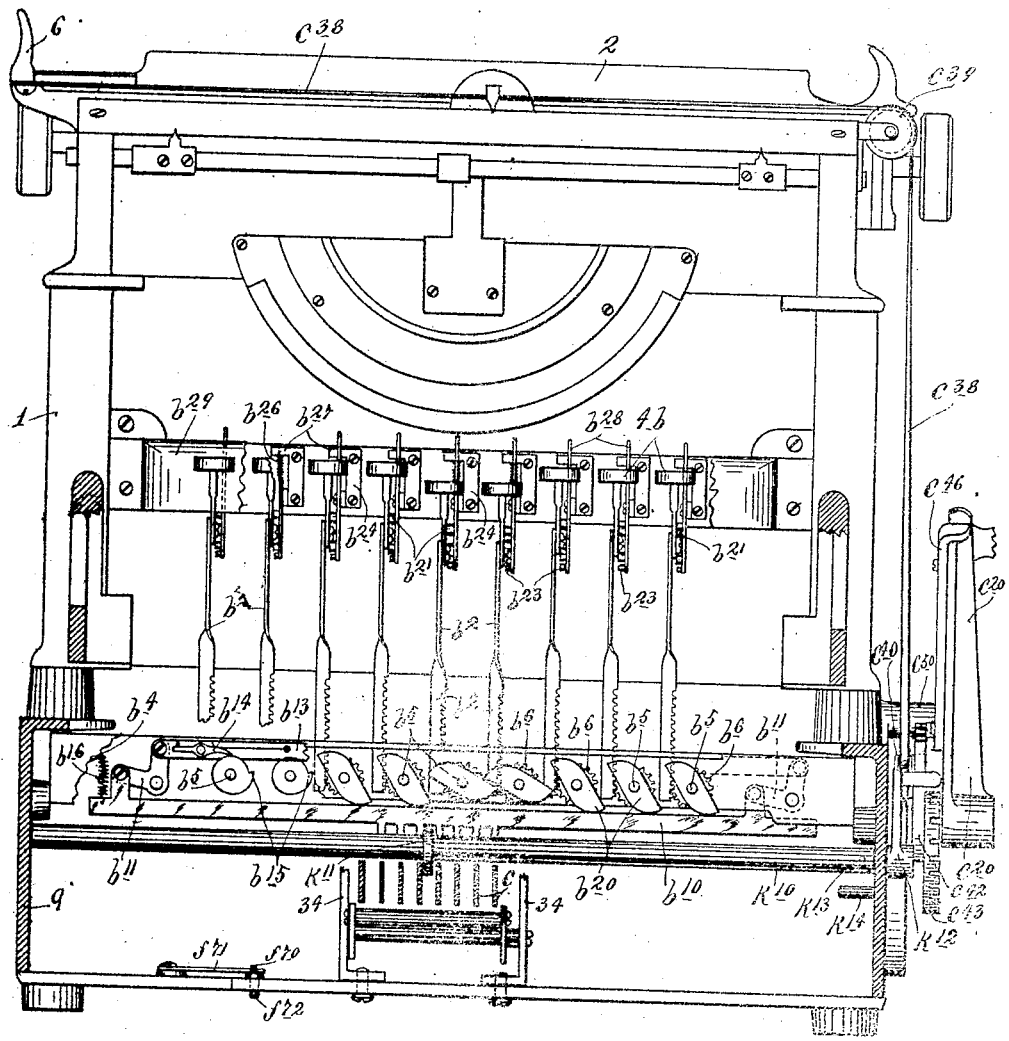
Figure 5:
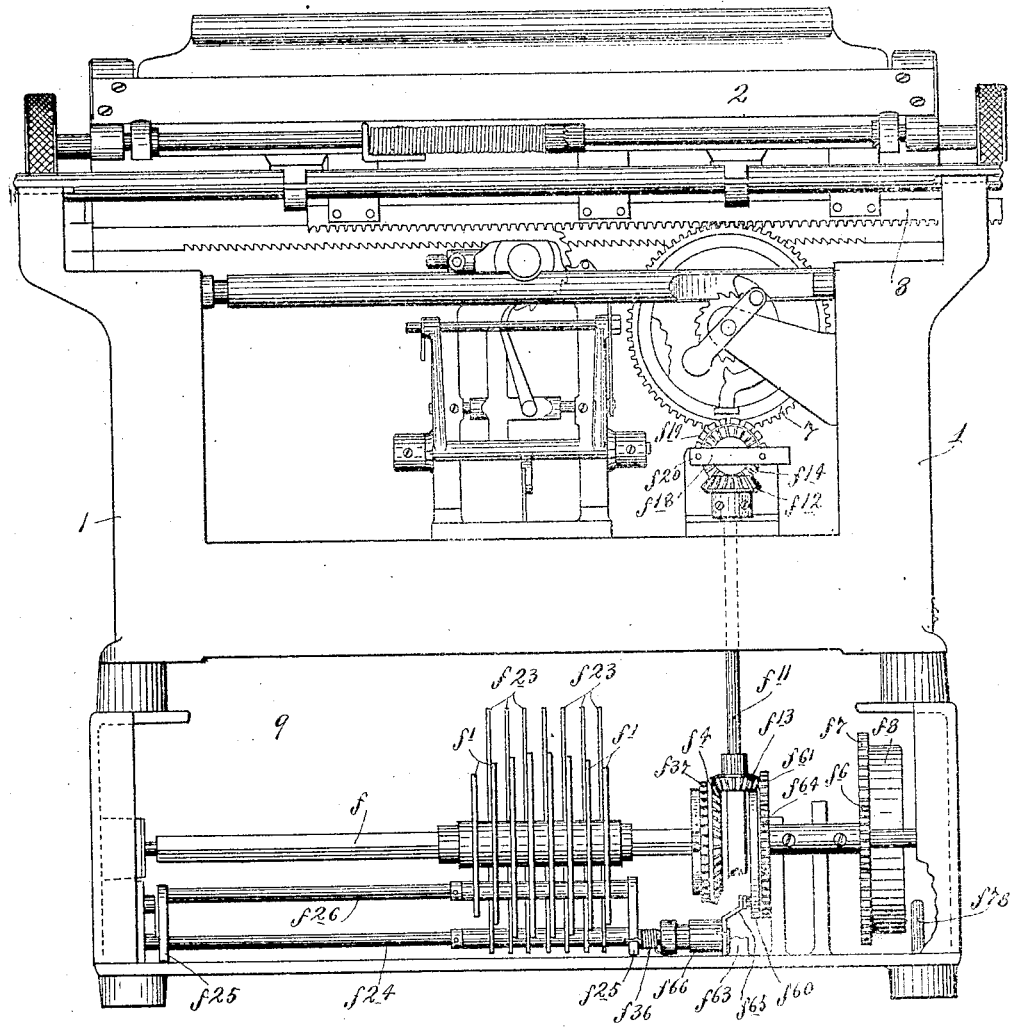

In said drawings; Figure 1 is a vertical longitudinal section through the combined machine from front to rear approximately on the line $x^1$ $x^1$ of Fig. 3. Fig. 2 is also a vertical longitudinal section through the combined machine on the line $x^2$ $x^2$ of Fig. 3 looking in the opposite direction from the view shown in Fig. 1, with some parts removed. Fig. 3 is a plan view of the computing machine detached from the typewriter, the cover of the computing machine having been removed, with some parts removed and some parts broken away. Fig. 4 is a vertical cross section through the combined machine approximately on the irregular line $x^4$ $x^4$ $x^4$ of Fig. 1, with some parts removed. Fig. 5 is a rear end elevation of the same, with some parts removed and others broken away. Fig.

Figure 7:
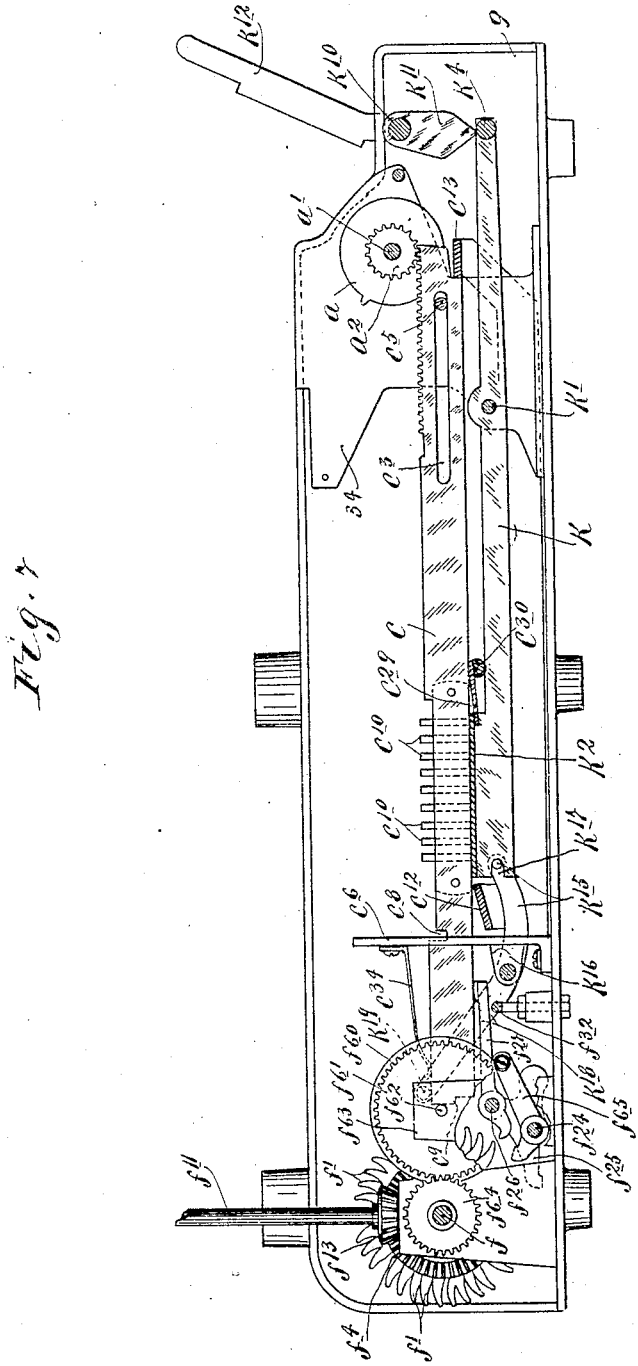
Figure 8:
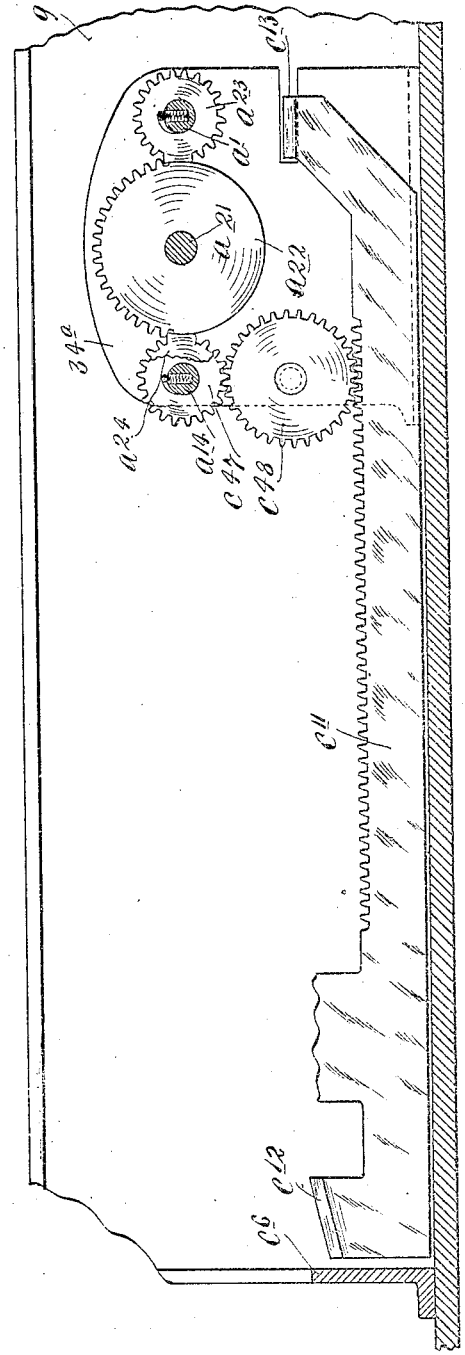

6 is a view of the computing machine detached, partly in right side elevation and partly in section on the line $x^6 \ x^6$ of Fig. 3, with some parts removed and others broken away. Fig. 7 is a vertical longitudinal section through the computing machine detached, approximately on the irregular line $x^7 \ x^7 \ x^7$ of Fig. 3, with some parts removed. Fig. 8 is a detail in vertical section on the line $x^8 \ x^8$ of Fig. 3, with some parts removed. Figs. 9 and 10 are details showing one of the numeral keys and the two-way full stroke device in side elevation, but in different positions from that shown in Fig. 1.

In the detailed description, the following classification of the mechanisms and of the reference notations appropriated thereto, have been made, to-wit:—The parts of the typewriter and the computer case, designated by numerals. The register proper or counting devices, designated by $a$ and its powers. The unit bars, their key and other connections, designated by $b$ and its powers. Decimal order or register bars, preliminary representation devices or unit pins, operating carriage and associated parts, designated by $c$ and its powers. Decimal order selector or rotary tappet drum, lifting levers and associated parts, designated by $f$ and its powers. Error-correcting device designated by $k$ and its powers.

For the old parts illustrated, which are identical with the parts shown in my pending application, the same notations will chiefly here be employed as were used for the same parts in the said pending case; but as more or less of the parts disclosed in the pending case will not be specified herein, the notations will not read, necessarily, in the regular order of sequence as to the powers of the reference letters employed.

*Typewriter and register case.*—The typewriter illustrated is a No. 5 Underwood. The construction and operation of such a typewriter is well understood, and for the purposes of this case, it is deemed sufficient to identify only a few of the parts thereof.

The numeral 1 represents the typewriter frame; 2 the typewriter carriage; 3 the type bars; $4^a$ the character keys; $4^b$ the numeral keys; 5 the spacing bail or space bar. All these keys are spring held in their uppermost or normal position. The numeral 6 represents the spring held line feed lever which is applied to the platen or roller in the customary way, not shown, so that when the lever 6 is actuated, the roller and paper will be moved one step, as required for the line feed. The typewriter carriage is under tension from a suitable motor spring and moves from the right toward the left, with a step by step motion, under the control of a suitable escapement subject to the key action. These parts are all of the customary form and are partially illustrated in Fig. 5 of the drawings. For the purposes of this case, it is deemed sufficient to identify the motor-driven gear wheel 7, and the carriage rack 8 with which the same engages.

The numeral 9 represents the computer case or main frame upon which the typewriter is detachably supported.

*The register.*—The register or counting mechanism of the computer is located near the forward end and cross center of the computer case 9, as shown in Figs. 1, 2, 3 and 7. In the detail of its structure and mode of operation, the register is identical with the register disclosed in my above identified application; and in principle of structure and operation, the register is also substantially identical with the register disclosed in my above identified prior patent, differing therefrom only in some minor details. Hence, for the purposes of the present case it is not deemed necessary to specify and trace the action of the parts of this register in detail. It is deemed sufficient to identify only a few of its parts. Said register includes a proper set of decimal order or digit bearing wheels $a$ (eight being shown), mounted on a cross shaft $a^1$ supported in the computer case and having loosely mounted on their hubs gear wheels $a^2$ connecting therewith through an intermediate ratchet and one-way ball clutch, not shown, which wheels are in mesh with the teeth of the underlying rack-ended register bars $c$ and are subject to the action thereof, when the carriage of the computer is moved forward by its hand lever $c^{20}$, as will later appear. The register wheels $a$ are held against accidental movement by roller-equipped spring held levers $a^6$ mounted on a transverse shaft $a^7$. On a parallel cross shaft $a^8$ are mounted certain wheels constituting parts of the tens carrying mechanism, two of these only appearing in the drawing, to-wit, the six-toothed wheel $a^9$ and the three-toothed wheel $a^{10}$. On another parallel cross shaft $a^{14}$ are mounted a series of gear segments or toothed arms $a^{15}$ which coöperate with the parts on the shaft $a^8$ in the tens-carrying action. Said parts shown and identified coöperate with other parts not shown, but fully disclosed in my said pending application to afford a register wherein the number of counting wheels $a$ may be simultaneously operated or rotated to different distances, in any order, by the register bars $c$ under the forward motion of the computer carriage, and that, thereby, the tens-carrying devices will be so set that the tens will be carried forward from one denomination to the other in the regular order of the decimal scale, or from right to left, on the return motion of the computer carriage. The said parts of the said register are so constructed and so related that the register wheels $a$ may all be brought back to zero or starting position by the manipulation of a hand knob $a^{20}$ on a shaft $a^{21}$ journaled in the left side wall of the computer case, as shown in Fig. 3, and having on its inner end a segmental gear $a^{22}$, the teeth of which engage with a gear $a^{23}$ on the shaft $a^{1}$ supporting the register wheels $a$, and also with a gear $a^{24}$ on the shaft $a^{14}$ which supports the sector gears $a^{15}$ constituting parts of the carrying mechanism, as best shown in Fig. 8. These gears $a^{22}$, $a^{23}$ and $a^{24}$ are of such construction and so related to each other and to the respective shafts on which they are mounted, that by turning the knob $a^{20}$, in a forward direction, all the register wheels $a$ will be brought back to their normal or zero position, and all the carrying devices will then also be in their normal position. The said zero devices above marked $a^{20}$ to $a^{24}$ inclusive, are identical with the devices disclosed in my said pending application marked $t^{11}$, $t^{13}$, $t^{14}$ and $t^{15}$, and therein designated the secondary or hand action zero restoring devices.

*Unit bars, their key and other connections.*—With the exception of the key connections, these parts are identical with those fully disclosed in my said pending application, and substantially the same as those in my prior patent, and hence, only a few of the parts thereof will here be identified.

Directing attention especially to Figs. 1, 2, 3 and 4, it will be seen that the numeral keys of the typewriter have pivoted thereto depending racks $b^2$ with the rack teeth thereof located at the lower end of the bar. Said rack bars $b^2$ work through seats or slots $b^3$ formed in the forwardly projecting flange or angle bar side piece of an oblong rectangular frame $b^4$ supported from the computer case with its longer dimension crosswise of the register bars $c$ and the key board of the typewriter. In the frame $b^4$ are journaled a series of nine rock shafts $b^5$ spring held in their normal position. These shafts $b^5$ have at their forward ends gears $b^6$ which are engaged by the teeth of the racks $b^2$ depending from the numeral keys of the typewriter. In the frame $b^4$ are mounted nine so-called unit bars $b^{10}$ parallel with each other and coupled by bell cranks $b^{11}$ with a corresponding set of overlying tie bars $b^{13}$ with the unit bars located below and the tie bars located above the cross rock shafts $b^5$. The coupled parts $b^{10}$ and $b^{13}$, or in other words the unit bars and the tie bars, each are separately spring held in their uppermost or normal position. Each of said tie bars $b^{13}$ is provided with a spring held pawl $b^{14}$, and each of said rock shafts $b^5$ is provided with a cam $b^{15}$ adapted to engage with the pawl of the proper tie bar when the corresponding numeral key of typewriter is operated so as to turn said rock shaft; and under this action, the tie bar $b^{13}$ will be moved toward the left, and the underlying unit bar $b^{10}$ be thereby lowered, in virtue of the bell crank couplings between the two, and this lowering of the unit bar $b^{10}$ will bring the same in proper position to act on the proper member of the nine so-called unit pins $c^{10}$ which are frictionally seated in a vertical position in each of the underlying register bars $c$.

It has already been stated that the rock shafts $b^5$ are each spring held in normal position. This is done by separate springs $b^7$. The pawls $b^{14}$ on the tie bars $b^{13}$ and the cams $b^{15}$ on the rock shafts $b^5$ are so related that the cams will pass the pawls after moving the tie bars a proper distance, thereby permitting the coupled bars $b^{10}$ and $b^{13}$ to be returned, by their retracting springs $b^{16}$ to their uppermost or normal position, in advance of the return movement of the key lever $4^b$ and corresponding rock shaft $b^5$ which had been actuated thereby. This insures the necessary quick action of the unit bars $b^{10}$ so as to do the work on the pins $c^{10}$ and get back out of the way before another register bar $c$ is lifted under the action of the tappet drum, as will later appear.

Comparison with my prior pending case will show that the only detail of difference noted under this general heading is in the direct connection of the racks $b^2$ to the numeral key levers $4^b$ of the typewriter, instead of the use of separate computer keys capable of action on the numeral key levers of the typewriter.

In practice, I have found that on a combined machine of this class, or any computing machine, it is desirable to avoid the possibility of operating any two of the adjacent numeral keys or keys operating the computer, at the same time; and one of my details of improvement is directed to this end. For this purpose, I place on the forward ends of the rock shafts $b^5$ interfering pieces $b^{20}$ which, on account of their function, might well be called key stops. Otherwise stated, these pieces $b^{20}$ project in each of two directions from the shafts to which they are fixed, and they all lie in a common plane and sufficiently close to each other so that any adjacent pair thereof will interfere with each other, if the corresponding numeral keys are simultaneously depressed; and this interference will occur sufficiently early to prevent the simultaneous full stroke of the said two keys. Their action in this respect will be readily understood from an inspection of Fig. 4, wherein the fourth and fifth keys from the right are shown as partially depressed and the interfering or stop blocks $b^{20}$ as engaging with each other and preventing any further simultaneous lowering of the two keys. This is enough to secure the desired guard on the part of the operator, because the trouble, if any, always arises from the operator striking two adjacent keys with a single finger. The force of habit or natural timing of the finger action insures the desired sequence in all other parts of the key board.

Experience has also demonstrated that on this combined typewriting and computing machine it is desirable to have a full stroke of the numeral key levers in each direction of their pivotal movement. The same key must not be used twice, in succession, without first substantially returning to its uppermost position, or otherwise the cam $b^{15}$ on the corresponding rock shaft $b^5$ may not come into position to engage with the pawl $b^{14}$ of the coöperating tie bar $b^{13}$ which is coupled, as hitherto noted, with the underlying unit bar $b^{10}$. The key lever must also go downward to its limit, so as to make sure that the type bar will make the proper stroke and leave the desired impression of the type on the paper held against the typewriter platen roller. I therefore provide a two-way full stroke device of extremely simple and novel construction, and which is made the subject matter of said separate application, S. N. 388,177, filed Aug. 12, 1907, so far as its broad relations to the key lever in any sort of a machine is concerned. The said device is here shown, and combination claims including the same are here presented, however, because of its special relations to the immediately coöperating parts of the combined typewriter and computing machine herein disclosed. This full stroke device is illustrated in Figs. 1, 4, 9 and 10. By reference to these views, it will be seen that I provide as one element thereof a two-way or double-faced ratchet $b^{21}$ fixed to one of the profile faces of each of the numeral key levers $4^b$; and that, for coöperation therewith, I provide a pivoted pawl lever $b^{22}$ pivoted to a stationary part of the typewriter frame and having at its lower end a rhomb-shaped pawl tip $b^{23}$, the opposite points of which are adapted to engage with the opposite faces of the double ratchet $b^{21}$ in the opposite direction of the key lever's pivotal motion. As shown, the pawl levers $b^{22}$ are pivoted at a point above their center of gravity, to the lower end projection of hanger brackets $b^{24}$ which are secured to a cross bar $b^{25}$ fixed to the forward uprights or face plate of the typewriter. Springs $b^{26}$ connect the heads of each pawl lever $b^{22}$ with the upper end projections $b^{27}$ of the hanger brackets $b^{24}$. The fulcrum point or pivotal center of each pawl lever $b^{22}$, the anchorage point of the spring $b^{26}$, the point of its attachment to the head of the pawl lever $b^{22}$ and the central line of the double ratchet $b^{21}$, are substantially in a common vertical line; and, hence, the said spring $b^{26}$ tends always to bring the pawl lever into the position shown in Fig. 2 when the numeral key lever is in its uppermost or normal position; and when the parts are in this position, the pawl tip $b^{23}$ will lie directly under the lower end of the two-way ratchet $b^{21}$. The stroke of the key lever is slightly greater than the length of the said ratchet $b^{21}$, and the ends of the ratchet $b^{21}$ are so shaped as to have a camming action on the pawl tip $b^{23}$ which, in turn, give a pivotal motion to the pawl lever $b^{22}$, rocking the same forward or backward against the tension of the centering spring $b^{26}$ far enough to shift the pawl tip from one to the other of the two faces of the ratchet, as required for the desired action in respect thereto. Hence, it follows, in virtue of this construction, that if a numeral key lever be depressed from the position shown in Fig. 2, the lower end of the ratchet $b^{21}$ will strike the pawl tip $b^{23}$ and thereby swing the pawl lever $b^{22}$ slightly forward, so that under the continued downward motion of the key lever, said pawl tip will coöperate with the forward or front face or teeth of the ratchet; and, hence, if the operator should remove his finger from the key before he has made a complete stroke, the pawl tip will be in engagement with the ratchet, as shown in Fig. 9, and will thereby prevent the upward or return motion of the key lever. After a full downward stroke has been imparted to the key lever, the centering spring $b^{26}$ will swing the pawl lever rearward and bring the pawl tip $b^{23}$ so that it occupies a corresponding position directly over the upper end of the ratchet $b^{21}$, and when the key lever starts to return under the tension of its retracting spring, the top of the ratchet will strike the pawl tip and rock the pawl lever further rearward so that the pawl tip will coöperate with the teeth on the rear edge of the ratchet, as shown in Fig. 10; and, hence, it will follow that the key lever cannot again be depressed, until it completes its upward or return movement, for if any premature attempt be made to depress the key lever, the pawl tip $b^{23}$ will engage with the tooth of the ratchet and hold the key lever. It therefore follows that this simple device necessarily insures that the numeral key levers shall receive full strokes in each direction of their pivotal motion; and it further follows that the rock shafts $b^5$ and the unit bars $b^{10}$ can be operated from the key levers through the racks $b^2$ depending therefrom, so as to reliably insure the performance of their required functions.

As it may be desirable, some times, to release the numeral key lever from its coöperating full stroke device, the pawl levers $b^{22}$ are each provided with upwardly extended releasing fingers $b^{28}$ by which the said pawl levers may be rocked, by the operator, in either direction required for this purpose. In practice, I fix to the face plate of the typewriter a shield $b^{29}$, as shown in Fig. 1, in proper position to protect the full stroke devices from being accidentally interfered with by the operator; and the top plate of this shield is slotted to permit the upper ends or tips of the releasing fingers $b^{28}$ to project therethrough in position to be seen and readily manipulated by the operator.

*The register bars, unit pins, operating carriage and associated parts.*—Most of these parts are identical with those shown in my pending application, and substantially the same as those shown in my prior patent, and hence, the old parts will only be identified so far as deemed essential to show the application of the improvement herein disclosed and claimed. As to this group of mechanism, it will be necessary, however, to go into detail somewhat more fully than has been done with other groups hereinbefore considered.

The machine illustrated is shown as equipped with eight register wheels $a$ and seven of these, to-wit, all except the one at the extreme left, are provided with gear wheels $a^2$ mounted on their hubs; and, for coöperation with these seven gear wheels, seven rack-ended register bars $c$ are provided and are arranged with their rack teeth held in engagement with the corresponding members of said gear wheels, all as best shown in Figs. 1, 2 and 7. Each gear wheel $a^2$ is connected to its corresponding register wheel $a$ through a suitable one-way clutch, such as a ratchet wheel and coöperating pawl, not shown. The eighth register wheel, to-wit, the one at the extreme left in respect to Fig. 3, has no coöperating register bar but is provided simply to accumulate the "tens" from the next lower denominational order.

It has been already noted that the register bars $c$ are each provided with nine unit pins $c^{10}$ frictionally seated therein and subject to the action of the unit bars $b^{10}$, when the corresponding numeral keys $4^b$ are struck. At their forward end portions, the said register bars $c$ have slots $c^3$ extending lengthwise thereof, through which pass a guide rod $c^5$ fixed to the sides of the register brackets 34 and serving to hold the rack portion of the bars $c$ in mesh with the gear wheels $a^2$ of the register wheels $a$ under the proper travel of the said bars $c$, and to permit a pivotal motion of the said bars $c$ on the said rod $c^5$ as a fulcrum, when the said bars are in their rearmost or normal position, as required in order to have the unit pins $c^{10}$ set by the unit bars $b^{10}$. At their rearward portions the register bars $c$ normally rest in and are guided by a vertically slotted guide plate $c^6$ secured to the computer case 9, and the upward pivotal motion of said bars is limited by the vertical height of the slots in said guide plate $c^6$. Said register bars $c$ are subject to depressing springs $c^{34}$ fixed to said plate $c^6$ which normally, yieldingly hold the rear ends of the bars in their lowermost position. The central part of the register bars $c$, or portion wherein the unit pins $c^{10}$ are frictionally mounted, is of less height than the other portions of the bars, and, directly adjacent to the rear end of the reduced parts of the bars, they are provided with notches $c^8$ which permit said spring depressed bars $c$ to be raised for a limited distance when they are in their rearmost or normal position, as required to bring the unit pins $c^{10}$ thereof within range of a unit bar $b^{10}$ depressed under the action of one of the numeral keys; but when the said register bars $c$ are moved forward, even to a small extent beyond their rearmost or normal position, their higher portion will be under the overlying solid part of the slotted guide plate 6, and they will thereby be held from any vertical motion whatever; and this relation is maintained all the time that the said bars are being moved forward by the computer carriage and until returned thereby to their extreme rearmost or normal position.

At their rear ends, each register bar $c$ is undercut to afford a shoulder $c^9$ on each bar with which one of the latch levers $f^{23}$ engages to hold the register bar in its uppermost position, long enough to permit the desired unit pin $c^{10}$ to be set by the unit bar and be so held until tripped out therefrom under the action of the next adjacent lifting lever $f^{27}$ operated by the rotary tappet drum, as will hereafter be noted.

A pair of rack bars $c^{11}$ extend lengthwise of the computer case 9 adjacent to the side walls of the same, and are connected by a rear cross tie bar $c^{12}$ and forward cross bar $c^{13}$; and the said parts together constitute the main portion of what is called the computer carriage, the same being so mounted as to rest upon the floor of the computer case 9 and be properly held for straight line forward and backward motion, under the manipulation of the hand lever $c^{20}$ located at the right side of the machine, as best shown in Figs. 2, 3, 4 and 6. The hand lever $c^{20}$ is removably secured to cross shaft $c^{18}$, which extends entirely across the computer frame and has on its opposite end a segmental gear wheel $c^{19}$ which engages one of the members of a pair of small gear wheels $c^{17}$ on an underlying parallel cross shaft $c^{16}$ and engaging with the racks $c^{11}$ of the computer carriage, as best shown in Figs. 1, 2 and 3. It follows, that the computer carriage will be moved by and in the same direction as the hand lever $c^{20}$.

The cross bar $c^{12}$ of the computer carriage is set on a slight upward incline and is so located that, when the carriage is moved forward, said bar $c^{12}$ will engage with all of the unit pins $c^{10}$ which have been depressed or set, under the key action, and thereby, move the register bars $c$ forward with the carriage and make the same operate the register wheels $a$. On account of this function of the bar $c^{12}$ it is called the push bar of the carriage. Usually the bars $c$ will be so moved for different distances. The left hand member of the pair of racks $c^{11}$ constituting the side bars of the computer carriage, engages with a gear $c^{48}$ journaled on a stud shaft fixed to bearing bracket 34ª near the left side wall of the computer case and which, in turn, engages with a pinion $c^{47}$ mounted on the tens carrying shaft $a^{14}$, as shown in Fig. 8. This pinion $c^{47}$ connects with its supporting shaft by a one-way clutch, so that it is free to turn on the shaft when the computer carriage is moving forward; but when the computer carriage is returned toward the rear, the pinion $c^{47}$ will be clutched tight to the shaft $a^{14}$ and thereby impart a full rotation to the shaft $a^{14}$ and cause the tens carrying devices properly to do their work so as to carry the tens on the register and be ready for the next addition.

Whatever members of the unit pins $c^{10}$ have been set or depressed on the register bars $c$ must, of course, be returned upward to their normal position before they can be reset for another number. This is accomplished by a pivoted spring held restoring blade $c^{29}$ fixed to a shaft $c^{30}$ journaled in the computer case and provided at one end with a depending lug $c^{32}$ which stands in the path of a spring pawl $c^{33}$ pivoted to the left hand member of the pair of carriage rack bars $c^{11}$, as shown in Fig. 1, these parts being so related that, under a forward movement of the operating carriage, the pawl $c^{33}$ will yield against its spring and pass under the lug $c^{32}$ of the shaft $c^{30}$, but that, under an initial part of the return movement of the computer carriage toward the rear, the said pawl $c^{33}$ will engage with said lug $c^{32}$ and thereby rock the pin restoring blade $c^{29}$ upward and cause the same to restore all the set unit pins $c^{10}$ to their uppermost or normal positions. It will do this, because under the forward movement of the carriage, the set pins of the register bars were all brought by the push bar $c^{12}$ into a common line crosswise of the computer case; and hence, the said pins will be in a common row directly above the restoring blade $c^{29}$ at the time the latter is rocked upward, under the initial return movement of the computer carriage.

The typewriter carriage is so connected with the hand lever $c^{20}$ that the forward motion of the hand lever $c^{20}$ may be made to effect the line feed of the platen roller and to return the typewriter carriage to its right hand or initial position. For this purpose, these connections are exactly the same as in my prior application. The parts shown herein include the flexible connection or strap $c^{38}$ which takes hold of the line feed lever 6 of the typewriter platen on the typewriter carriage, passes thence over a guide sheave $c^{39}$ on the typewriter frame, and thence down to a spring held take-up wheel $c^{40}$ suitably mounted on the outer face of the right hand wall of the computer case and having on its hub a pinion $c^{41}$ which engages with a segmental gear $c^{42}$ formed on a common hub with a notched segmental stop plate $c^{43}$, which integrally formed parts $c^{42}$ and $c^{43}$ are subject to a torsional spring $c^{44}$, tending to throw the same in the direction of the arrow shown in Fig. 6, thereby tending to rotate the take-up wheel $c^{40}$ in the proper direction indicated by the arrow thereon to take up the slack in the connection $c^{38}$. The tension of the spring $c^{44}$ applied to the parts $c^{41}$, $c^{42}$ and $c^{43}$, as just hereinbefore noted, must be less than the tension of the spring on the line feed lever 6 of the typewriter platen. Alongside the notched stop segment $c^{43}$ is mounted, on the shaft $c^{18}$, an adjustable stop arm $c^{45}$ adapted to be sprung into any one of the notches of said plate $c^{43}$. On the hand lever $c^{20}$ is mounted a thumb action slide $c^{46}$, held under sufficient friction to stay wherever it is set, and when this is pushed to its lowermost position, its lower end will engage with the stop arm $c^{45}$ and thereby make any further forward motion of the hand lever $c^{20}$ operate the parts $c^{43}$, $c^{42}$, $c^{41}$ and $c^{40}$, and thereby wind up the strap $c^{38}$ on the take-up wheel $c^{40}$ and draw the typewriter carriage toward the right. If the stop arm $c^{45}$ is properly set in respect to the notches of the stop segment $c^{43}$, for the predetermined line margin or initial position of the typewriter carriage, then the forward motion of the hand lever $c^{20}$ will restore the typewriter carriage to its right hand or starting position. If the thumb slide $c^{46}$ is raised to its uppermost limit, then the hand lever can be operated, as often as desired, without having any effect on the typewriter carriage, and is so operated in making cross-footings of numbers listed in a horizontal line. When said hand lever $c^{20}$ is in its rearmost or normal position, it rests against an elastic stop $c^{50}$ fixed to the adjacent wall of the computer case 9.

*Decimal order selector or rotary tappet drum and its associated devices.*—It is in this group of mechanism, as indicated in the introductory statements, that the most radical features of my present invention appear. Many of the parts, however, are identical with those fully disclosed in my pending application, and many are also identical or substantially like those disclosed in my prior patent. Hence, the old notation will be followed as far as practicable. This group of mechanism is best shown in Figs. 1, 2, 3, 4, 5, 6, and 7.

The shaft $f$ of the tappet drum or decimal order selector is mounted in the computer case and connected up to the typewriter in much the same way as in my pending application, but instead of having a single whirl or row of spirally arranged tappets $f^1$, the shaft is now equipped with four whirls or spiral rows of such tappets, with eight tappets in each row or whirl. Moreover, one of these tappets in each row or whirl has two points or tapping surfaces, and is located in the third position from the right hand of the drum, or a position corresponding to that required for a period when listing decimal numbers, as dollars and cents. In other words, the two pointed tappet is for the purpose of punctuation, in order to permit a space to be secured and a period printed on the typewritten sheet, and also has a safety function hereinafter noted. The reason for the use of the four whirls or spiral rows of tappets $f^1$ is to enable the cross footings or listing of numbers in horizontal lines on the typewritten sheet, and the adding together of said numbers on the computer so that the total thereof can be printed, by the typewriter, at the right hand margin of the printed sheet. The tappet drum is driven from a suitable motor spring $f^{10}$ fast at one end to a winding shaft $f^9$, and its other end to a spring barrel or case $f^8$, shown in Figs. 3, 5, 6 and 7. Said spring case or barrel $f^8$ is loose on the winding shaft $f^9$, and has formed integral therewith a gear $f^7$ which meshes with a pinion $f^6$ fixed to the tappet shaft $f$. Hence, when so permitted, the motor spring $f^{10}$ in the barrel or casing $f^8$, will impart rotary motion to the tappet shaft $f$ and the tappets $f^1$. On the tappet shaft $f$ is fixed a bevel gear $f^4$ which engages a bevel pinion $f^{13}$ fixed to the lower end of a vertical shaft $f^{11}$ mounted in suitable bearings on the typewriter case and computer case, and having at its upper end a similar bevel pinion $f^{12}$ with the same number of teeth and which engages with the bevel gear $f^{14}$ fixed to a counter shaft suitably journaled in the typewriter frame. On the said counter shaft is mounted, with freedom for sliding motion, a wide faced pinion $f^{16}$ that remains always in engagement with the gear 7 to which the motor spring of the typewriter is applied, and which gear 7 is in engagement with the fixed rack 8 of the typewriter carriage. The parts $f^{14}$ and $f^{16}$ are provided with half clutches $f^{17}$ adapted to engage with each other when the pinion $f^{16}$ is at the rearmost limit of its sliding motion. The sliding pinion $f^{16}$ is subject to a shipper lever or push bar which, because of its function, is called the adding switch or switch key, and is marked $f^{18}$. This switch key $f^{18}$ has notches $f^{22}$ which may be engaged with the slotted face plate of the typewriter casing, through which the said lever projects, to lock the switch key in either its forward or rearward position, as can be readily understood from Fig. 1. At its rear end, the switch key bar $f^{18}$ is bent laterally and provided with pins $f^{20}$ projecting forwardly, adapted to engage with the notches of a lock disk $f^{19}$ fixed to or formed integral with the bevel pinion $f^{14}$, so as thereby to lock and hold the said pinion $f^{14}$ and all its connected parts in its locked or idle position, at the time when the switch key $f^{18}$ is drawn to its forward or unclutched position. When the switch key $f^{18}$ is pushed to its rearward position, the parts $f^{14}$ and $f^{16}$ will be clutched together, and the escapement of the typewriter will then be made to control the rotary motion of the vertical shaft $f^{11}$ under the key action; and, hence, will also control the rotary motion of the tappet drum $f$ $f^1$. The gear connections are such, in point of relative size or number of teeth, that the tappet shaft $f$ turns two full revolutions while the typewriter carriage makes one full movement from the right toward the left. As there are four whirls or spiral rows of the tappets $f^1$, it follows that each row of tappets $f^1$ can operate twice on the lifting levers $f^{27}$ during one complete traveling movement of the typewriter carriage. It further follows from this, as will presently more fully appear, that the machine is capable of listing and adding in a single horizontal line eight numbers, as shown in the illustrations given in the introductory statement.

In suitable bearings fixed to the computer case 9, properly spaced apart from each other, is journaled a rock shaft $f^{24}$ located below and slightly to the rear of the register bars $c$ and below and slightly to the front of the rotary tappet drum $f$ $f^1$, as best shown in Figs. 1, 5 and 7. To this shaft are rigidly secured a pair of triangular shaped heads or brackets $f^{25}$, the upwardly projecting tips of which are rigidly connected by a cross tie rod $f^{26}$. The said parts $f^{24}$, $f^{25}$ and $f^{26}$, taken together, constitute a rocking frame which is subject to a retracting spring $f^{36}$, shown in Fig. 3 as a torsional spring applied to one of the heads $f^{25}$, which tends to hold the said rocking frame in its rearward or normal position.

On the tie rod $f^{26}$ are pivoted the series of lifting levers $f^{27}$ for lifting the register bars $c$, under the action of the tappets $f^1$ of the tappet drum. Said lifting levers $f^{27}$ are of such construction that their forward or long arms have parts underlying the respective register bars $c$, and that their rear or short arms have parts standing in the paths of the tappets $f^1$ of the tappet drum, when the rocking frame composed of the parts $f^{24}$, $f^{25}$ and $f^{26}$ is in its rearmost or normal position. These lifting levers $f^{27}$ stand in their normal or idle position under the action of gravity, with their long arms in their lowermost position resting on a fixed stop rod $f^{32}$.

On the shaft $f^{24}$ of the rocking frame are pivoted a corresponding series of latch levers $f^{23}$ which are normally held in their forward position by a corresponding series of springs $f^{33}$. These latch levers $f^{23}$ have lateral studs $f^{30}$ which, under the spring tension on the latch levers, normally abut against the rear ends of the register bars $c$ in proper position to engage under the shoulders $c^9$ of said register bars $c$ when the latter are raised to their uppermost limit by the lifting levers $f^{27}$, under the action of the tappets $f^1$ of the tappet drum, thereby serving to hold the particular register bar $c$ lifted up long enough to permit the proper pin $c^{10}$ thereof to be set, by the proper member of the unit bars $b^{10}$, under the key action. Said lateral studs $f^{30}$ are of such length that they pass to the right beyond the bars $c$ against which they yieldingly abut, so that the projecting ends thereof stand in the paths of upwardly projecting tripping fingers $f^{31}$ formed integral with the lifting levers $f^{27}$. The portion of the long arm of any given lifting lever $f^{27}$ which operates on a particular register bar $c$ is offset toward the right so as to be staggered in respect to the tripping fingers $f^{31}$. Otherwise stated, these parts are so related that the tripping finger $f^{31}$ of any lifting lever $f^{27}$ will operate on an adjacent latch lever $f^{23}$ to release the register bar $c$ last previously lifted, or bar $c$ of the next higher denominational order, just in advance of the time when the long arm of the lifting lever $f^{27}$ will lift the register bar $c$ of the next lower order. Otherwise stated, the lifting levers $f^{27}$, under the action of the tappets $f^1$ of the tappet drum, operate on two adjacent register bars $c$, in the proper sequence, nearly simultaneously to release the bar previously lifted and permit it to be instantly returned to its normal position by its depressing spring $c^{34}$, and to lift the register bar $c$ of the next lower order to a point where it is caught and will be held by its coöperating latch lever $f^{23}$. It must, therefore, be obvious that, under the action of the rotary tappet drum, the register bars $c$ will be lifted and released in the proper order, and each lifted register bar will be held up long enough by its coöperating latch $f^{23}$ to permit its proper unit pin $c^{10}$ to be set by the proper unit bar $b^{10}$ under the key action.

To the bevel gear wheel $f^4$, fixed to the tappet shaft $f$, is rigidly secured a ratchet wheel $f^{37}$ which is normally engaged by a gravity acting retaining dog or pawl $f^{38}$ (see Fig. 6), which serves to prevent any return rotary motion of the tappet drum until the said ratchet $f^{37}$ is released from said pawl $f^{38}$. The forward or long arm of this dog $f^{38}$ overlies a rearwardly projecting releasing arm $f^{39}$ fixed to the shaft $f^{24}$ of the so-called rocking frame made up of the parts $f^{24}$, $f^{25}$ and $f^{26}$, hitherto noted. When the computer carriage is in its rearmost or normal position, as shown in Figs. 1 and 3, the rocking frame, made up of the parts $f^{24}$, $f^{25}$ and $f^{26}$, is held in its rearmost position by its retracting spring $f^{36}$, as hitherto noted; and, at this time, its roller $f^{40}$, carried on the forward corner of its right hand frame plate $f^{25}$, can rise to its limit in a notch $f^{41}$ in the right hand rack bar $c^{11}$ of the computer carriage. This notch $f^{41}$ is so related to the undercut part of the bar $c^{11}$ which extends rearward thereof, that when the computer carriage is drawn forward, the notch will have a camming action on the roller so as to force the same downward and rock the frame forward, thereby bringing the roller under the undercut part of the bar $c^{11}$, by which the rocking frame will then be held in its forwardly tilted position, or as shown in Fig. 2, until the computer carriage is again returned to its rearward position. During the time that the rocking frame is so held, the lifting levers will be outside the field of action of the tappets $f^1$. This downward camming action on the roller $f^{40}$ occurs at the very initial part of the forward motion of the computer carriage, or forward motion on the hand lever $c^{20}$; and hence, the forward rocking motion of the shaft $f^{24}$ of this rocking frame will raise the releasing arm $f^{39}$, projecting rearward therefrom, and knock the retaining dog $f^{38}$ out of the ratchet disk $f^{37}$ on the tappet drum shaft $f$, thus releasing said tappet drum and permitting the same to turn backward under the forward motion of the hand lever $c^{20}$ or during the return motion of the typewriter carriage to its right hand or starting position.

Referring more in detail to the two-pointed member of the tappets $f^1$, the same has a double purpose or function. It not only serves to permit a space movement of the typewriter carriage without setting any unit pin, and hence, wherein the punctuation mark may be printed; but it insures a register bar $c$ being in proper position to get a unit pin set when the next numeral key is struck, and this even if a tabulating device be used on the typewriting machine. In the machine of my pending application, one tappet was left out to afford a circumferential gap in the circle of the tappet drum so that a punctuation key or the space bar could be struck and the carriage be permitted to move one step without bringing any part of the tappet drum into action on the lifting levers or the register bars. In practice, it was found that an operator might strike the space bar and follow with the numeral key so quickly, or strike the two so nearly together in point of time, that the following tappet of the drum might not have rotated far enough to act on a lifting lever $f^{27}$, in time to raise a register bar $c$ soon enough to have a unit pin $c^{10}$ set under the key action. By having a tappet in the same whirl, at the punctuation space, the register bar $c$ is lifted and latched up by the first point of the double tappet just before the space bar or punctuation key is struck; hence, it is there when the next numeral key is struck and the pin is bound to be set. The second point of the double pointed tappet will then have no action on the register bar.

The second point of the two-pointed tappet is needed when a tabulator is employed, as is usual on the commercial machine. When a tabulator is employed, the rocking frame, made up of the parts $f^{24}$, $f^{25}$ and $f^{26}$, is tilted forward, at the instant the tabulating key is depressed; then the typewriter carriage moves to the tabulating stop, and the tabulating key is released, thus permitting the said rocking frame to return to its normal position under the action of its retracting spring $f^{36}$. If the tabulating stop arrested the carriage and the tappet drum opposite a pre-determined punctuation point space, as, for example, a space for a comma between two sets of three numbers, then the advance member of the two-pointed tappet will be in such position that it cannot operate on a lifting lever $f^{27}$ when the next key is struck, but the second or following point of the two-pointed tappet would be in such position that it would surely operate on one of the lifting levers $f^{27}$ and raise one of the register bars $c$ and latch the same up, in time to insure the setting of a unit pin, if a numeral key should be the one struck. These tabulating devices are shown in my pending application, but are not illustrated in this case. With said tabulating devices, the typewriter carriage makes one step of movement upon the release of the tabulating key, as is customary with all such devices; and this is the reason why the advance point of the two-pointed tappet will not be in position to operate on the lifting lever.

The parts so far specified enable the combined machine to cross list and add numbers in a horizontal line. The machine could also be manipulated to list and add numbers in vertical columns, but it would not be possible to specify, on the same cross line, the details or items making up the charge number, if such specification should require the use of any of the numeral keys; or otherwise stated, it would not be possible to do a piece of work like the invoice illustrated in the introductory statement. The parts which I have added to this group of mechanism in order to make the machine do work like that illustrated in the invoice, will now be described, special attention being called to Figs. 3, 5, 6 and 7 of the drawings.

Figure 6:
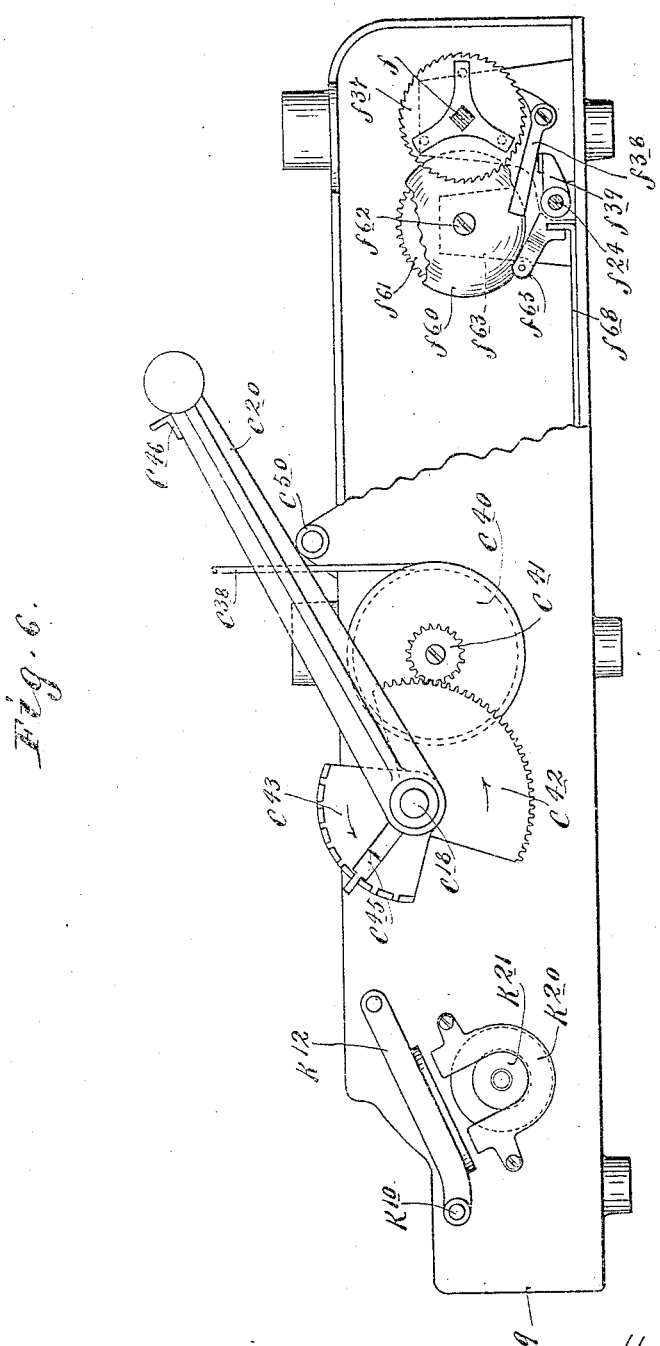

A cam $f^{60}$ has formed integral therewith or secured thereto a gear wheel $f^{61}$; and these parts are mounted on a stud $f^{62}$, fixed to bearing bracket $f^{63}$ rising from the bed of the computer case 9, to the left of the center of said case and directly in front of the tappet drum shaft $f$, as best shown in Fig. 3. The gear $f^{61}$ engages with a pinion or smaller gear $f^{64}$ fixed to the tappet shaft $f$. The sizes of the said gears $f^{61}$ and $f^{64}$ are related as two to one; from which it follows that the cam $f^{60}$ will receive one full revolution in two revolutions of the tappet drum shaft. The cam $f^{60}$ is of disk-like form, and its periphery is the active surface of the cam. For about three-fourths of the circumference of the cam disk, its periphery is struck from a common center with a common radius, and then, for a little more than the other fourth of its surface, the disk is reduced so as to have a low part, as shown in Fig. 6. A roller-equipped cam lever $f^{65}$ is loosely sleeved on a sleeve $f^{66}$ which is adjustably and rigidly secured to the shaft $f^{24}$ of the rocking frame made up of the parts $f^{24}$, $f^{25}$ and $f^{26}$, hitherto noted. Said two sleeves have slot and pin connection, as shown at $f^{67}$, Fig. 3, so that the said lever $f^{65}$ is capable of a sliding motion lengthwise of the said sleeve $f^{66}$ on the said shaft $f^{24}$. The roller of the said lever $f^{65}$ engages with the peripheral or active cam surface of the cam disk $f^{60}$ when the parts are in the position shown in Fig. 3. The cam lever $f^{65}$ is embraced by the upwardly extending prongs of a shipper lever $f^{68}$ resting on the bed of the computer case, as shown in Fig. 6, pivoted thereto at $f^{69}$ for sidewise motion, and at its forward end has a pin $f^{70}$ adapted to be engaged by a spring latch $f^{71}$ with two notches spaced apart and adapted to hold the shipper lever $f^{68}$ in two different positions as required for holding the cam lever $f^{65}$ in or out of engagement with the cam $f^{60}$, as may be desired. For greater convenience in operating the shipper lever $f^{68}$, it is provided at its forward end, with a pin $f^{72}$ which projects downward through a slot $f^{73}$ in the bed of the computer case, as shown in Fig. 3, where it can be easily reached by the operator. The slot and pin connection between the sleeve $f^{66}$ fixed to the shaft $f^{24}$ and the hub or sleeve portion of the cam lever $f^{65}$, as shown at $f^{67}$, permits the required sliding motion of the cam lever $f^{65}$ while requiring the same to rock with the sleeve $f^{66}$ and the shaft $f^{24}$ of the rocking frame, so that when the rocking frame is tilted forward, the roller of the cam lever $f^{65}$ will be rocked forward or out of the path of the periphery of the cam disk $f^{60}$. The releasing arm $f^{39}$ for the retaining dog $f^{38}$, which acts on the ratchet wheel $f^{37}$ of the tappet shaft $f$, as shown in Fig. 6, is formed as a rearward extension of the cam lever $f^{65}$. The active surface of this releasing arm $f^{39}$ is broad enough always to underlie the said retaining dog $f^{38}$, regardless of the sliding motion of the cam lever $f^{65}$ on the sleeve $f^{66}$.

If it now be again recalled that the high surface of the cam disk $f^{60}$ extends about three-fourths of the complete circle and the low surface about or a little more than one-fourth thereof, the further action of these parts can be readily understood. When the cam lever $f^{65}$ is in the position shown in Fig. 3, its roller engages the cam disk $f^{60}$, and the parts are so related to the rocking frame made up of the elements $f^{24}$, $f^{25}$ and $f^{26}$ hitherto several times noted, that as long as the high part of the cam disk engages the roller of the cam lever, the said rocking frame will be held in its foremost position, and all the lifting levers $f^{27}$ carried by its member $f^{26}$ will be held so far forward as to clear all the tappets $f^{1}$ of the rotary tappet drum; but the drop in the cam surface is such that, as soon as the roller of the cam lever passes off from the high to the low surface of the cam $f^{60}$, the rocking frame will be instantly restored by its retracting spring $f^{36}$ to its rearmost position, thereby bringing the lifting levers $f^{27}$ within the reach of the tappets $f^{1}$ of the rotary tappet drum. Hence, it is obvious, that this cam device just hereinbefore described will, when set as shown in Fig. 3, permit the rotary tappet drum to make one and three-fourths revolution before any of its tappets will operate on the lifting levers $f^{27}$; and then, for the remaining fourth of the tappet drum's revolution, the tappets of one whirl or spiral row of tappets $f^{1}$ will be operative on the lifting levers and the register bars.

From the foregoing, it will be seen that the cam $f^{60}$ and its associated devices, constitute a controller for rendering all the four whirls or spiral rows of tappets $f^{1}$ of the tappet drum inoperative during seven-eighths of the total working travel of the typewriter carriage, and one of said whirls or spiral rows of tappets to become operative during the final eighth of the travel of the typewriter carriage, thus adapting the machine to do work like the invoice.

It is equally obvious, that to adapt the machine to the two different kinds of work, illustrated in the introduction, that it is only necessary to shift the cam lever $f^{65}$ from its active to its idle position, or vice versa, which can be readily done by manipulating the shipper lever $f^{68}$.

The winding shaft $f^{9}$ of the spring motor of the computer is subject to a winding key $f^{75}$, as shown in Fig. 3, and to a locking lever $f^{76}$ which coöperates with a ratchet (not shown) but which is fixed to said winding shaft $f^{9}$ to hold the motor spring $f^{10}$ under the tension to which it is wound. The spring barrel $f^{8}$ is provided with a lateral stop lug $f^{77}$ which coöperates with a vertical stop pin $f^{78}$ fixed to the bed of the computer case for limiting the rotation of the spring barrel $f^{8}$ when it moves far enough in either direction; and this stop device prevents any further change in the tension of the spring, after it has been properly wound, than that which comes from its normal or proper use in the service. Of course, the spring barrel $f^{8}$ receives reverse or spring winding movement from the tappet drum when the typewriter carriage is returned to its normal or right hand position.

*Error correcting device.*—For this purpose, in my present machine, I make use of most of the devices employed for that purpose in the machine of my pending application, and simply add other parts with a view of securing increased efficiency. The parts of the error-correcting device are best shown in Figs. 1, 3 and 7, and are marked with the reference letter $k$ and its powers, as in my pending case.

A pair of parallel bars $k$ are rigidly connected by a cross tie or shaft $k^{1}$ which is journaled in suitable bearings fixed to the bed of the computer case, as clearly shown in Figs. 1 and 7. The rear ends of the bars $k$ are also connected by a cross plate $k^{2}$ of the proper surface dimensions to underlie all the unit pins $c^{10}$ of all the register bars $c$. At their forward ends, the bars $k$ are connected by a cross tie $k^{4}$. The parts marked $k$ to $k^{4}$ inclusive, constitute a tilting table which is brought into action whenever so desired to restore any one or more of misset unit pins $c^{10}$ to correct an error. This can be done by simply pressing down the forward end of the tilting table. As a convenient and reliable means for this purpose, there is mounted directly above the cross tie $k^{4}$, of the tilting table, a rock shaft $k^{10}$, suitably journaled in the side walls of the computer case 9, which shaft $k^{10}$ is provided with a depending cam arm $k^{11}$ fixed thereto, properly shaped at its lower end for action on the cross tie $k^{4}$ of the tilting table, and to pass the axis of said cross tie under a slight springing motion of the parts. The shaft $k^{10}$ projects beyond the side wall of the computer case, and is provided with a small handle $k^{12}$. Normally, the handle $k^{12}$ is in the position shown in Fig. 6, and the cam $k^{11}$, and the tilting table, will then be in the position shown in Fig. 1 of the drawings. When, however, it is desired to operate the error-correcting table, the handle $k^{12}$ is pulled forward, thereby bringing the parts into the position shown in Fig. 7, where they will be held under sufficient friction to prevent any accidental displacement thereof, from the fact that the cam $k^{11}$ has been moved rearward beyond the axis of the cross tie $k^{4}$, under the springing action of the parts hitherto noted. The depression of the forward end of the error-correcting table, of course, raises the rear end thereof, and causes the plate $k^2$ to restore all the unit pins $c^{10}$ to their uppermost or normal position, if any thereof had been previously depressed by the unit bars $b^{10}$ under the key action. By reference to Fig. 7, it will be seen that when the parts of the error-correcting table are in the position there shown, the rear ends of the side bars $k$, of said table, stand in the path and close to the forward edge of the push bar $c^{12}$ of the computer carriage, from which it follows that the computer carriage cannot be operated while the error-correcting table is in error-correcting position. Otherwise stated, it locks the machine so its hand lever $c^{20}$ cannot be moved forward. The shaft $k^{10}$ is provided with a radial stop arm $k^{13}$, shown best in Fig. 3, which comes in contact with a stop pin $k^{14}$ projecting inward from the adjacent wall of the computer case 9, and serves to limit the forward rotary motion of the said shaft $k^{10}$ when manipulated by the handle $k^{12}$. A bail $k^{15}$ is pivoted to lugs $k^{16}$ fixed to the stationary guide plate $c^6$, and the forward rung of this bail $k^{15}$ rests in notches $k^{17}$ formed in the rear ends of the side bars $k$ of the error-correcting table, so that the latter constantly engage the said bail $k^{15}$ and will rock the forward end thereof upward, at the same time that the rear end of the table or error-correcting blade $k^2$ is raised upward into error-correcting position, as shown in Fig. 7. To the pivot shaft of the bail $k^{15}$ are rigidly secured a pair of arms $k^{18}$ which are connected, at their upper ends, by a cross tie $k^{19}$ overlying the rear end of all the register bars $c$, as best shown in Fig. 7. When the error-correcting table is in error-correcting position, as shown in Fig. 7, the upper end of the bail formed by the parts $k^{18}$ and $k^{19}$ will be depressed so that the cross tie $k^{19}$ thereof will rest upon and hold the rear ends of the register bars $c$ in their lowermost position, so that, under the upward movement of the pin-restoring blade $k^2$, no pivotal motion can be imparted to the register bars. This is desirable to insure the proper error-correcting action.

On the exterior surface of the right hand wall of the computer case 9 is located a receptacle or holder $k^{20}$ for an ink eraser $k^{21}$, of such construction that the eraser can only be removed therefrom from its upper or open end or mouth. This eraser holder $k^{20}$ is in such position, with reference to the position of the handle $k^{12}$, that when the latter is in its normal or idle position, as shown in Fig. 6, it will overlie the eraser and prevent the removal of the eraser until the handle $k^{12}$ is moved upward and forward. This is simply a little detail to prod the memory of the operator. The operator naturally uses the eraser to make any correction by him seen to be needed on the printed sheet. Hence, if he makes a rule to keep the eraser in the receptacle $k^{20}$, he will have to manipulate the lever $k^{12}$ to get the eraser, and thereby be reminded that he should manipulate this lever far enough to correct the error in the preliminary representation devices of the computer; or otherwise stated, so as to restore a misset unit pin, if the error is in the listing of the numbers to be added. In practice, it has been found that some memory prod of this sort is desirable. In respect to this feature of correcting errors, it must be borne in mind that the unit pins $c^{10}$ are set under the control of the key action and the rotary tappet drum, for all the digits of the entire number before any transfer is made to the counting wheels of the register. Otherwise stated, the unit pins $c^{10}$ constitute preliminary representation devices which are first set up for all the digits of any given number and which latter are brought into action when the computer carriage is moved by the hand lever $c^{20}$ for transferring the said number to the counting wheels of the register. It is, therefore, entirely practical, to correct any error which may have been made under the key action before this transfer is effected.

*Operation.*—In view of the detailed description of the different groups of mechanism hereinbefore given, and the general statements made in the introduction, the operation of the machine as an entirety is probably clear. It may be serviceable, however, briefly to note some of the manipulations required for the different classes of work. All the parts must, of course, be in their proper adjustment. For example, the typewriter carriage should be so connected up with the take-up device that, when the hand lever $c^{20}$ of the computer carriage receives a full forward stroke, with its thumb piece $c^{46}$ in its lowermost position so as to engage with the stop arm $c^{45}$ and operate the take-up device, the typewriter carriage will, thereby be restored to its right hand or initial starting position. When the typewriter carriage is in its said initial position, the left hand member of the tappets $f^1$, in one of the rows of the tappet drum, should be ready to act on the left hand member of the series of lifting levers $f^{27}$, if it be desired to employ all four of the whirls or spiral rows of tappets so as to cross list and add numbers in a horizontal line. It must also be understood that if cross listing and adding is to be done, the cam lever $f^{65}$ must be in its idle position, in respect to the cam $f^{60}$, so that the said four spiral rows or whirls of tappets $f^1$ will be operative on the lifting levers $f^{27}$ and the register bars $c$ actuated thereby. The counting wheels of the register must also be in a zero position.

In the commercial machine, each row of the tappet drum has eleven tappets, and there are ten register or decimal order bars.

In the machine illustrated, however, the rows of tappets in the tappet drum are shown as if having only eight tappets. This provides for seven digits and one punctuation mark in ten spaces of the travel of the typewriter carriage. For example, the machine will list and add a number like this $18976.42; and if the typewriter carriage can travel eighty spaces, it will cross list and add eight such numbers. Assume that the first number of the cross line is to be $18976.42, and the parts to be in the position above stated, then the operator will strike the dollar mark key, then follow with the digit keys and period key in the order appearing in the number. The double pointed tappet gives the two space movements required for the period and the digit in the tens order of cents. Next the operator raises the thumb piece $c^{46}$ of the hand lever $c^{20}$ of the computer carriage, and, then, gives to said lever a complete forward and backward stroke, thereby transferring the listed number to the counting wheels of the register, without moving the typewriter carriage. Suppose the next number is 342.57, the operator strikes the space bar three times, thereby, bringing the proper tappet $f^1$ of the tappet drum in position for action on the register bar of the proper order for the highest digit of this number, and, then, he strikes the digits and the punctuation key of this number in regular order, and then again operates the hand lever $c^{20}$ as before with the thumb piece up, thereby transferring the second number and adding the same to the first number on the register. He then follows for successive numbers in this manner, until the entire series of eight possible numbers are cross listed on the same horizontal line and added together on the computer; and, then, he brings the hand lever $c^{20}$ to its central position, reads the total shown by the computer and strikes the proper keys to print the same at the right end of the cross line of the printed sheet. In this central position of the hand lever $c^{20}$, the numeral keys of the typewriter can be operated to print the said numbers without setting up any unit pins in the register bars, because the rocking frame, on which the lifting levers $f^{27}$ are mounted, will thereby be rocked forward and hold said levers out of the field of action of the tappets $f^1$. The numbers having thus been cross listed and added, the operator then lowers the thumb piece $c^{46}$ and makes a complete forward and backward stroke of the hand lever $c^{20}$, thus making sure that the carriage of the typewriter is at its initial or starting position, and, then, actuates the zero knob $a^{20}$, restoring the counting wheels to zero, whereupon all the parts will be in readiness for the next line. Let it now be assumed that the operator wishes to make an invoice, such as the illustration given in the introduction. He will actuate the shipper lever $f^{68}$ so as to shift the cam lever $f^{65}$ into its active position in respect to the cam $f^{61}$, thereby, rendering the cam operative to keep all the lifting levers $f^{27}$ out of the field of the tappets of the tappet drum until the typewriter carriage makes about seven-eighths of its full travel; and will then proceed to manipulate the typewriter, in the usual way, to specify the items of the charge. If these do not occupy seven-eighths of the line, he then strikes the space bar or tabulating key, in cases where the typewriter is equipped with tabulating devices until he gets into the last eighth of the carriage's travel, and will then list the charge number, at the right end of the line. He will then operate the hand lever $c^{20}$, with the thumb piece pushed down to its limit, thereby both transferring the number to the register and bringing the typewriter carriage back to its starting or normal position. Then he repeats the operation, for the next line of the invoice, again gives the hand lever $c^{20}$ a complete forward and backward stroke with its thumb piece down, thus adding the second charge number to the first, and so on to the end of the invoice; whereupon, he can bring the hand lever to its central position, read the total on the computer and print it at the foot of the vertical column of the charge numbers. The zero knob $a^{20}$ is then again manipulated to restore the counting wheels to zero, and the machine will be all ready for the next invoice.

The manipulations above detailed are employed to utilize the improvements herein disclosed and claimed, for the two classes of work illustrated in the introduction. The proper manipulations for other classes of work are specified in my prior patent and pending application.

It should be further noted that the drawings forming a part of this application have been prepared from the full sized working machine, and that all the statements as to the action of the parts hereinbefore made, have been based upon the demonstrated actions of said working machine. The said full-sized working machine, intended for commercial purposes, includes numerous devices not herein specifically disclosed because not deemed necessary for the purposes of this case. For example, said commercial machine includes a zero device or device for restoring the counting wheels of the register to zero automatically upon the movement of the computer carriage, after touching a zero key, and tabulating devices, including a tabulating key having connections of the kind disclosed in my pending application hereinbefore identified.

What I claim is:—

1. In combination a register, a preliminary representation device, key-controlled means for setting said preliminary representation device involving a movable denominational order selector having a plurality of sets of similar tappets with the said parts so arranged that the members of each set can be brought into action in succession, and that the successive sets may succeed each other in action, to repeatedly set said preliminary representation devices, and means for bringing the set preliminary representation devices into action on said register after each set of said tappets has been used, substantially as described.

2. In a combined typewriting and computing machine, the combination with a typewriting mechanism including keys and a traveling carriage, of a register, register bars, preliminary representation pins in each bar, a movable decimal order selector having a plurality of sets of similar tappets, the members of any given set of which tappets come into action in succession to select said register bars for any given number, and the successive sets of which tappets come into operation in succession to set said bars for different numbers, in different zones of the travel of the typewriter carriage, and means for moving the said register bars, without moving the typewriter carriage, to transfer the represented numbers in succession to the register, whereby the combined machine is adapted to cross list and add numbers in a horizontal line, substantially as described.

3. In a combined typewriting and computing machine, the combination with a typewriting mechanism including keys and a traveling carriage, of a register, a series of register bars each containing a series of unit pins adapted to be set for a digit of any number, a rotary decimal order selector having a step by step motion in time with the typewriter carriage, and provided with a plurality of whirls or spiral rows of tappets, the members of each whirl of which come into action in succession to select said register bars for any given number, and the successive rows or whirls of which tappets come into operation in successive zones of the travel of the typewriter carriage to select said register bars for the digits of different numbers, and means for moving the decimal bars to transfer to the register the numbers represented by the set pins without moving the typewriter carriage, substantially as described.

4. The combination with the typewriter including keys and a traveling carriage, of a computer having a register, register bars each with a series of unit pins, a rotary order decimal selector having a step by step motion in time with the typewriter carriage, a plurality of spiral rows of tappets which come into operation in succession, in different zones of the typewriter's travel, to select the register bars of the digits of different numbers listed in said different zones by the printing devices of the typewriter, the computer carriage subject to a hand lever for moving the said register bars to transfer the represented numbers to the register without moving the typewriter carriage, and connections adapted to be brought into action, at will, for making the movements of said hand lever also move the typewriter carriage to restore the same to normal or initial starting position, substantially as described.

5. In a combined typewriting and computing machine, the combination with typewriting mechanism including keys and a traveling carriage, of a register, and a decimal order selector having a step by step motion, in time with the carriage of the typewriter, and provided with one or more rows of tappets, the members of which come into action in succession to select the decimal orders, one or more of which tappets is provided with two points or tapping surfaces capable of the same identical selective action, in two successive steps of the travel of the typewriter carriage, thereby permitting one of said steps to be available for printing a punctuation mark on the printed sheet between successive digits, one of which digits is selected by one of said tapping surfaces, in the other of said two successive steps of travel of said typewriter carriage, substantially as described.

6. In a combined typewriting and computing machine, the combination with typewriting mechanism including keys and a traveling carriage, of a register register bars having a series of unit pins adapted to be set to represent the digits of any desired number, and a decimal order selector having a step by step motion in time with the travel of the typewriter carriage, and provided with one or more rows of tappets, the members of which tappets in each row come into action to select the register bars to secure the representation of the digits of the proper decimal orders, and one or more of which tappets in each of said rows is provided with two points or tapping surfaces acting on the same register bar, in two successive steps of the travel of the typewriter carriage, thereby permitting one of said steps to be available for printing a punctuation mark on the printed sheet between successive digits, as a period between dollars and cents, and the other to select the proper bar for the digit of the next lower order, such as the tens digit for cents, substantially as described.

7. The combination with typewriting mechanism including keys, and a traveling carriage, of a computer which is operated from the numeral keys of the typewriter, and which computer has a register, register bars, and a decimal order selector movable, with a step by step motion, in time with the typewriter's carriage, and having one or more sets of tappets, the members of which sets of tappets operate in succession to select said register bars for the digits of listed numbers, and an automatic controller adapted to render said decimal order selector inoperative, as to said bar selecting action, throughout some predetermined zone of the working travel of the typewriter's carriage, and then to render the said decimal order selector operative as to said bar selecting action during a remaining zone of the working travel of the typewriter, substantially as and for the purposes set forth.

8. The combination with typewriting mechanism including keys, and a traveling carriage, of a computer which is operated from the numeral keys of the typewriter, and which computer has a register, register bars and the rotary decimal order selector or tappet drum having a step by step rotary motion, in time with the typewriter's carriage and geared to make two complete revolutions within the range of the typewriter's working travel, and having one or more whirls or spiral rows of tappets, the members of each of which whirls are adapted to act in succession to select the register bars for the digits of any number, and a cam geared to turn once while said tappet drum turns twice and operative to prevent the said tappet drum from any action on the said register bars throughout a predetermined zone of the travel of the typewriter's carriage and then to permit the tappet drum to become operative to select register bars during the remaining zone of the travel of the typewriter's carriage, substantially as and for the purposes set forth.

9. The combination with typewriting mechanism including keys, and a traveling carriage, of a computer which is operated from the numeral keys of the typewriter, and which computer has a register, the register bars having the series of unit pins adapted to be set under the key action, the rotary tappet drum having one or more spiral rows of tappets, the spring held rocking frame supporting lifting levers from which said tappets operate to select said register bars and also supporting latch levers and tripping fingers for coöperation therewith, and the rotary cam driven by said tappet drum and operative on said rocking frame to hold said lifting and associated levers out of the field of action of said tappets during a predetermined part of the working travel of the typewriter, and then to permit said rocking frame to be thrown by its retracting spring into its normal position so as to bring its lifting levers into the field of the tappets of said tappet drum and allow the latter to be operative thereon during the final or remaining travel of the typewriter's carriage, substantially as described.

10. In a computer provided with keys and having register wheels, register bars with unit pins adapted to be set by the keys, to represent the digits of any desired number, and the computer carriage operative on said register bars through said pins to effect the transfer of the represented numbers to said register, of a pin restoring device operative, at will, to restore the said pins to normal position, for the correction of an error, register bar locking devices and a common actuating device, for said error-correcting and bar locking devices, operative, at will, and serving also to lock the computer carriage from any motion until after said locking devices are released, substantially as described.

In testimony whereof I affix my signature in presence of two witnesses.

HANS HANSON.

Witnesses:
 H. D. KILGORE,
 JAS. F. WILLIAMSON.